United States Patent
Sato et al.

(10) Patent No.: US 11,059,472 B2
(45) Date of Patent: Jul. 13, 2021

(54) CONTROL DEVICE OF VEHICLE AND CONTROL METHOD OF VEHICLE

(71) Applicant: SUBARU CORPORATION, Tokyo (JP)

(72) Inventors: Fumiya Sato, Tokyo (JP); Takeshi Yoneda, Tokyo (JP)

( * ) Notice: Subject to any disclaimer, the term of this patent is extended or adjusted under 35 U.S.C. 154(b) by 198 days.

(21) Appl. No.: 16/196,719

(22) Filed: Nov. 20, 2018

(65) Prior Publication Data
US 2019/0193710 A1   Jun. 27, 2019

(30) Foreign Application Priority Data

Dec. 22, 2017 (JP) .............................. JP2017-246085

(51) Int. Cl.
| | |
|---|---|
| *B60W 10/08* | (2006.01) |
| *B60L 15/20* | (2006.01) |
| *B60W 10/06* | (2006.01) |

(52) U.S. Cl.
CPC ............ *B60W 10/08* (2013.01); *B60L 15/20* (2013.01); *B60L 15/2045* (2013.01); *B60W 10/06* (2013.01); *B60L 2220/42* (2013.01); *B60L 2240/423* (2013.01); *B60L 2260/26* (2013.01); *B60L 2260/28* (2013.01)

(58) Field of Classification Search
CPC .. B60L 15/20; B60L 15/2045; B60L 2220/42; B60L 2240/423; B60L 2260/26; B60L 2260/28; B60W 10/06; B60W 10/08
See application file for complete search history.

(56) References Cited

U.S. PATENT DOCUMENTS

| | | | | |
|---|---|---|---|---|
| 6,123,163 A | * | 9/2000 | Otsu ..................... | B60W 10/08 180/65.8 |
| 6,258,006 B1 | * | 7/2001 | Hanyu ..................... | B60K 6/48 477/5 |

(Continued)

FOREIGN PATENT DOCUMENTS

| | | |
|---|---|---|
| JP | 9-191582 A | 7/1997 |
| JP | 2001-119993 A | 4/2001 |

(Continued)

OTHER PUBLICATIONS

Notice of Reasons for Refusal issued in corresponding Japanese Patent Application No. 2017-246085 dated Oct. 29, 2019, with machine translation.

(Continued)

*Primary Examiner* — Babar Sarwar
(74) *Attorney, Agent, or Firm* — Troutman Pepper Hamilton Sanders LLP

(57) ABSTRACT

A control device of a vehicle includes a motor controller. The motor controller is capable of controlling a motor configured to generate a driving force of the vehicle, and switching between a first driving mode for driving the motor while using a continuous rated torque as an upper limit and a second driving mode for driving the motor while using a maximum rated torque as an upper limit, the continuous rated torque being lower than the maximum rated torque generatable by the motor. The motor controller drives the motor in the first driving mode in a case where a driver does not specify a driving mode.

6 Claims, 6 Drawing Sheets

(56) References Cited

U.S. PATENT DOCUMENTS

| | | | | |
|---|---|---|---|---|
| 6,260,644 B1* | 7/2001 | Otsu | ................ | B60L 50/16 |
| | | | | 180/65.25 |
| 6,533,692 B1* | 3/2003 | Bowen | ................ | B60K 6/52 |
| | | | | 475/5 |
| 7,734,401 B2* | 6/2010 | Joe | ................ | B60W 20/00 |
| | | | | 701/54 |
| 2001/0017470 A1* | 8/2001 | Takaoka | ................ | B60W 10/06 |
| | | | | 290/40 C |
| 2002/0024306 A1* | 2/2002 | Imai | ................ | B60K 6/36 |
| | | | | 318/34 |
| 2007/0221421 A1* | 9/2007 | Tanishima | ................ | B60W 30/20 |
| | | | | 180/65.245 |
| 2007/0227791 A1* | 10/2007 | Ueno | ................ | B60W 10/02 |
| | | | | 180/65.245 |
| 2008/0132379 A1* | 6/2008 | Matsubara | ................ | B60K 6/40 |
| | | | | 477/3 |
| 2010/0004089 A1* | 1/2010 | Iwase | ................ | B60W 10/115 |
| | | | | 477/3 |
| 2010/0087287 A1* | 4/2010 | Tabata | ................ | B60W 30/19 |
| | | | | 477/3 |
| 2013/0096764 A1* | 4/2013 | Yamamoto | ................ | B60W 20/20 |
| | | | | 701/22 |
| 2013/0218391 A1* | 8/2013 | Aizawa | ................ | B60L 15/2009 |
| | | | | 701/22 |
| 2013/0231816 A1* | 9/2013 | Hirata | ................ | B60W 10/08 |
| | | | | 701/22 |
| 2013/0289811 A1* | 10/2013 | Tolkacz | ................ | B60W 10/08 |
| | | | | 701/22 |
| 2014/0051546 A1* | 2/2014 | Maruyama | ................ | B60W 30/192 |
| | | | | 477/5 |
| 2014/0195082 A1* | 7/2014 | Takamura | ................ | B60L 15/2054 |
| | | | | 701/22 |
| 2015/0283994 A1* | 10/2015 | Matsumoto | ................ | B60K 6/445 |
| | | | | 701/22 |
| 2016/0090076 A1* | 3/2016 | Tsuji | ................ | B60W 10/113 |
| | | | | 477/5 |
| 2016/0176391 A1* | 6/2016 | Sato | ................ | B60W 10/08 |
| | | | | 701/22 |
| 2016/0185336 A1* | 6/2016 | Ueno | ................ | B60L 58/12 |
| | | | | 701/22 |
| 2019/0176649 A1 | 6/2019 | Goerick | | |

FOREIGN PATENT DOCUMENTS

| | | |
|---|---|---|
| JP | 2001-238306 A | 8/2001 |
| JP | 2002-159101 A | 5/2002 |
| JP | 2019-106873 A | 6/2019 |
| WO | 2014/196244 A1 | 12/2014 |

OTHER PUBLICATIONS

Notice of Reasons for Refusal issued in corresponding Japanese Patent Application No. 2017-246085 dated Mar. 31, 2020, with machine translation.

* cited by examiner

CONTROL DEVICE OF VEHICLE AND CONTROL METHOD OF VEHICLE

CROSS-REFERENCE TO RELATED APPLICATIONS

The present application claims priority from Japanese Patent Application No. 2017-246085 filed on Dec. 22, 2017, the entire contents of which are hereby incorporated by reference.

BACKGROUND

1. Technical Field

The present invention relates to a control device of a vehicle and a control method of a vehicle.

2. Related Art

Conventionally, Japanese Unexamined Patent Application Publication (JP-A) No. 2001-119993 includes a description in which, in the case where a load that is more than or equal to continuous rated output is to be applied to a motor over short-time rating time of the motor, it is possible to prevent the motor from having the load that is more than or equal to the continuous rated output over the short-time rating time of the motor by reducing acceleration of the motor and preliminarily reducing the load to be applied to the motor, and it is possible to optimize output characteristics of the motor.

SUMMARY OF THE INVENTION

An aspect of the present invention provides a control device of a vehicle. The control device includes a motor controller capable of controlling a motor configured to generate a driving force of the vehicle, and switching between a first driving mode for driving the motor while using a continuous rated torque as an upper limit and a second driving mode for driving the motor while using a maximum rated torque as an upper limit, the continuous rated torque being lower than the maximum rated torque generatable by the motor. The motor controller drives the motor in the first driving mode in a case where a driver does not specify a driving mode.

Another aspect of the present invention provides a control method of a vehicle that is performed by a control device of the vehicle, the control device including a motor controller capable of controlling a motor configured to generate a driving force of the vehicle, and switching between a first driving mode for driving the motor while using a continuous rated torque as an upper limit and a second driving mode for driving the motor while using a maximum rated torque as an upper limit, the continuous rated torque being lower than the maximum rated torque generatable by the motor. The motor is driven in the first driving mode in a case where a driver does not specify a driving mode.

An aspect of the present invention provides a control device of a vehicle. The control device includes circuitry configured to control a motor configured to generate a driving force of the vehicle, and switch between a first driving mode for driving the motor while using a continuous rated torque as an upper limit and a second driving mode for driving the motor while using a maximum rated torque as an upper limit, the continuous rated torque being lower than the maximum rated torque generatable by the motor. The motor controller drives the motor in the first driving mode in a case where a driver does not specify a driving mode.

DETAILED DESCRIPTION

In the following, some preferred examples of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

According to the technology described in the above-described JP-A No. 2001-119993, in the case where a load that is more than or equal to continuous rated output is to be applied to a motor over short-time rating time of the motor, acceleration of the motor is reduced and the load to be applied to the motor is preliminarily reduced. Therefore, the technology described in the above-described JP-A No. 2001-119993 includes a problem that the load within the short-time rating time of the motor is applied to the motor. Accordingly, when using the technology described in JP-A No. 2001-119993 described above, there is a possibility that the load is applied to the motor within the short-time rating time, the motor generates heat, and output from the motor rapidly decreases.

In addition, sometimes a driver wants to increase output of a vehicle in the case where the vehicle is used for sport driving, for instance. The technology described in JP-A No. 2001-119993 described above does not consider such desire of the driver, and it is impossible to increase output as necessary while suppressing the load on the motor.

Accordingly, it is desirable to provide a novel and improved control device and control method of a vehicle that are capable of certainly suppressing reduction in output occurred due to an overload on a motor.

Figure 1:
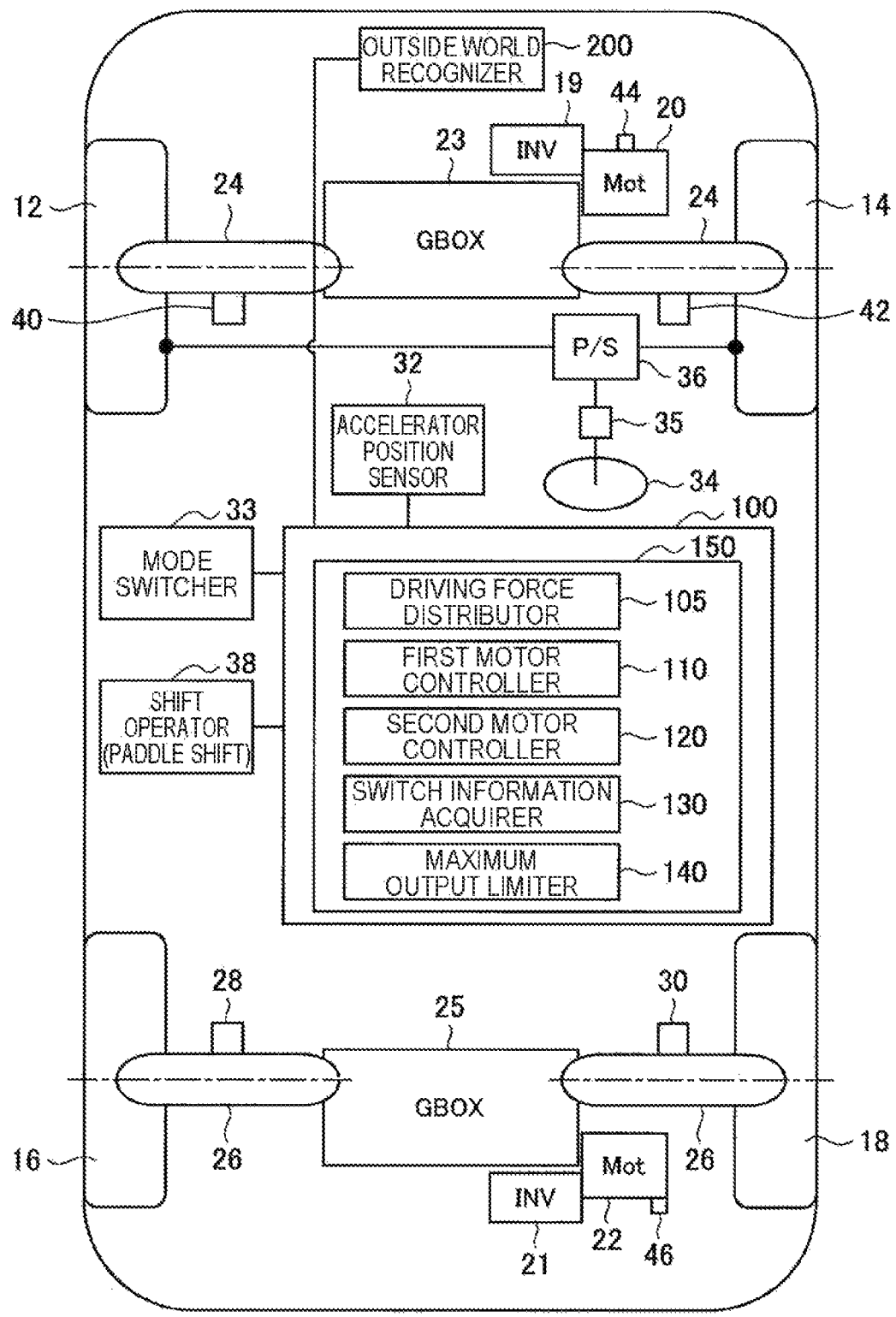
FIG. 1 is a schematic diagram illustrating a configuration of a vehicle according to an example of the present invention.

First, with reference to FIG. 1, the configuration of a vehicle 500 according to an example of the present invention will be described. FIG. 1 is a schematic diagram illustrating the configuration of the vehicle 500 according to the example of the present invention. As illustrated in FIG. 1, the vehicle 500 includes four tires (wheels) 12, 14, 16 and 18 including front and rear wheels, a control device (controller) 100, an outside world recognizer 200, a motor 20 that controls rotation of the front wheels 12 and 14, a motor 22 that controls rotation of the rear wheels 16 and 17, an inverter 19 that controls the motor 20, an inverter 21 that controls the motor 22, a gear box 23 and drive shafts 24 that transfer driving force of the motor 20 to the tires 12 and 14, a gear box 25 and drive shafts 26 that transfer driving force of the motor 22 to the tires 16 and 18, wheel speed sensors 40 and 42 that detect wheel speed (vehicle speed) from rotation of the respective tires 12 and 14 of the front wheels, wheel speed sensors 28 and 30 that detect wheel speed (vehicle speed) from rotation of the respective tires 16 and 18 of the rear wheels, an accelerator position sensor 32, a mode switcher 33, a steering wheel 34 that steers the front wheels 12 and 14, a steering angle sensor 35 that detects a steering angle δ of the steering wheel, a power steering mechanism 36, a shift operator (paddle shift) 38, a temperature sensor 44 that detects a temperature of the motor 20 of the front wheels, and a temperature sensor 46 that detects a temperature of the motor 22 of the rear wheels.

Note that, according to the configuration illustrated in FIG. 1, the vehicle 500 includes the one motor 20 for driving the front wheels and the one motor 22 for driving the rear wheels. However, the configuration of the vehicle 500 is not limited thereto. The vehicle 500 may include motors that respectively drive the four wheels and gear boxes corresponding to the respective motors.

In the present example, the control device 100 calculates driving/braking force of the motors 20 and 22, the control device 100 specifies the driving/braking force of the motors 20 and 22. Accordingly, the motors 20 and 22 are controlled cooperatively.

Figure 2:
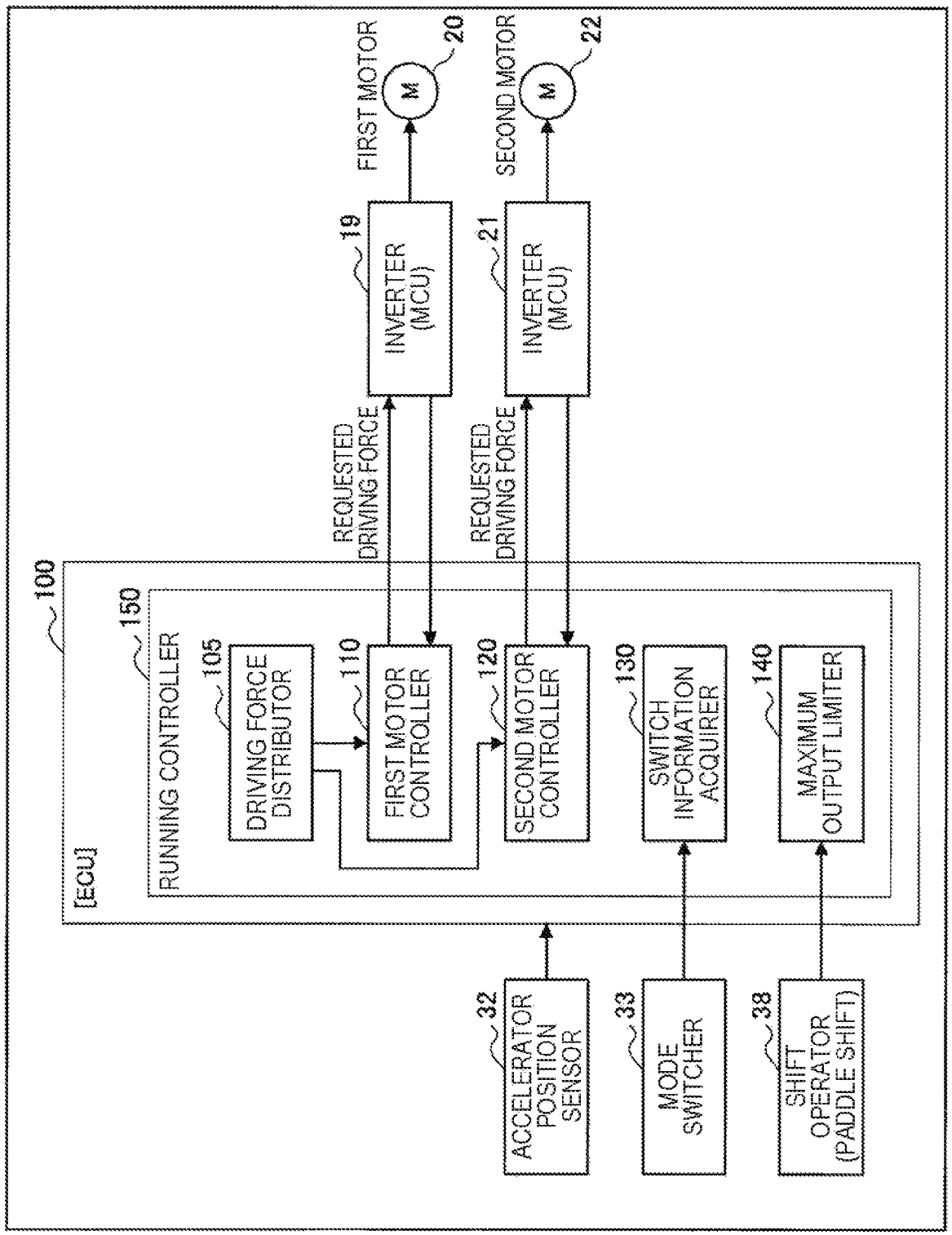
FIG. 2 is a schematic diagram illustrating detailed configurations of a control device and ambient structural elements.

FIG. 2 is a schematic diagram illustrating detailed configurations of the control device 100 and ambient structural elements. As illustrated in FIG. 2, the control device 100 includes a running controller 150 that controls the front and rear motors 20 and 22. The running controller 150 includes a driving force distributor 105, a first motor controller 110, a second motor controller 120, a switch information acquirer 130, and a maximum output limiter 140.

When an accelerator position is acquired from the accelerator position sensor 32, the driving force distributor 105 of the control device 100 calculates total requested driving force of the vehicle 500, and distributes the total driving force to the motor 20 of the front wheels and the motor 20 of the rear wheels.

The first motor controller 110 transmits a command value of requested driving force of the motor 20 of the front wheels, to the inverter 19 that controls the motor 20 of the front wheels. The inverter 19 controls the motor 20 of the front wheels on the basis of the command value of the requested driving force of the motor 20 of the front wheels.

The second motor controller 120 transmits a command value of requested driving force of the motor 22 of the rear wheels, to the inverter 21 that controls the motor 22 of the rear wheels. The inverter 21 controls the motor 22 of the rear wheels on the basis of the command value of the requested driving force of the motor 22 of the rear wheels.

The switch information acquirer 130 receives information related to switching of modes of the vehicle 500 from the mode switcher 33.

Figure 3:
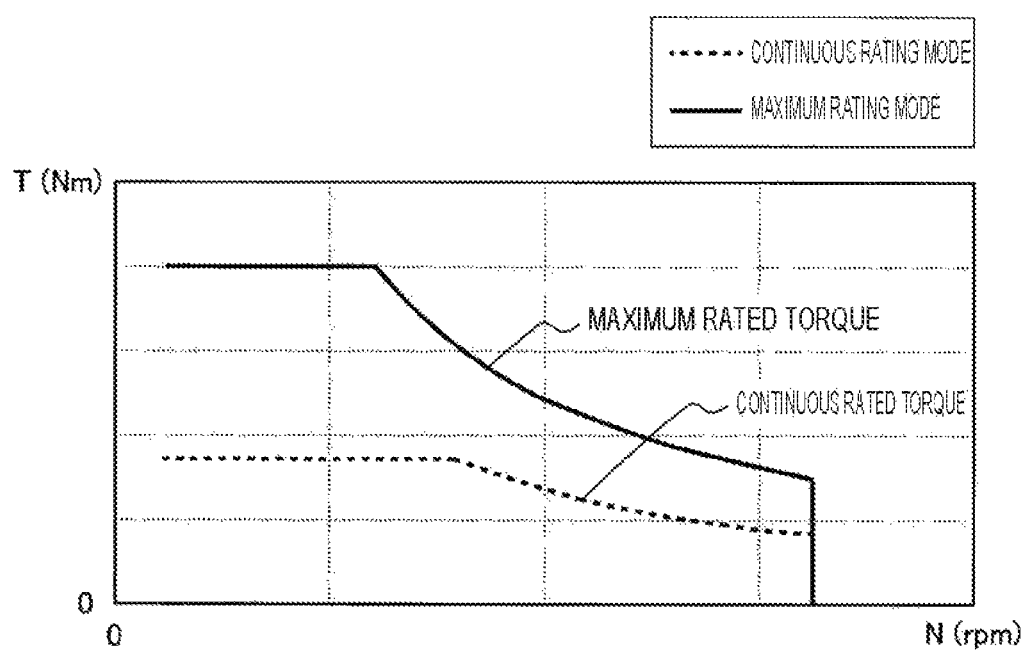
FIG. 3 is a schematic diagram illustrating output characteristics of a motor according to the example.

FIG. 3 is a schematic diagram illustrating output characteristics of the motors 20 and 22 according to the present example. FIG. 3 illustrates a relation between driving force (vertical axis: torque) and speed (horizontal axis: rotation speed) with regard to the motor 20 of the front wheels or the motor 22 of the rear wheels.

Driving modes of the motors 20 and 22 include a maximum rating mode and a continuous rating mode. In the maximum rating mode, it is possible to output a maximum torque value (maximum rated torque) that may be exerted by the motor, but duration of the maximum torque value is limited. When the motor is used in the maximum rating mode, the amount of internal heat generation rapidly increases, and this affects deterioration or the like of the motor. Therefore, in the maximum rating mode, duration (allowable time) of the maximum torque value is set. On the other hand, in the continuous rating mode, a torque value is limited more than the maximum rating mode. In the continuous rating mode, a torque value capable of being continuously output for a long time (continuous rated torque) is set as an upper limit. FIG. 3 illustrates respective torque characteristics in the maximum rating mode and the continuous rating mode.

In the present example, it is possible to independently control the respective motors 20 and 22. Therefore, it is possible to increase stability of the vehicle 500 by optimally controlling front-rear distribution of torque between the motor 20 of the front wheels and the motor 22 of the rear wheels. Specifically, according to the control specifications in the present example, the first motor controller 110 and the second motor controller 120 does not use the maximum rated torque but use the continuous rated torque as upper limits of basic torque output performance of the motors 20 and 22 in a normal mode.

Here, if the maximum rated torque is set as the upper limits of the basic torque output performance of the motors 20 and 22 in the normal mode, sometimes the motors 20 and 22 get overheated under a situation where overloads are applied to the motors 20 and 22 such as a case where a driver wants to enjoy sport driving, for instance. In such a case, for instance, it is possible to suppress heat generation in the motors 20 and 22 by switching to the control in the continuous rating mode on the basis of temperatures of the motors 20 and 22 detected by the temperature sensors 44 and 46. However, when the maximum rating mode is switched to the continuous rating mode in such a way, output from the motors 20 and 22 suddenly decreases. Therefore, acceleration of the vehicle 500 gets weakened, and the driver cannot drive as expected. In addition, unexpected vehicle behavior may occur, and behavior of the vehicle 500 is expected to become uncontrollable.

In the present example, the control specifications are set such that the continuous rated torque is used as the upper limits of the basic torque output performance of the motors 20 and 22 in the normal mode instead of the maximum rated torque. Therefore, it is possible to prevent sudden decrease in output from the motors 20 and 22 from occurring. This makes it harder for output from the motors 20 and 22 to decrease. Accordingly, it is possible to stabilize vehicle behavior without giving the driver with a feeling of strangeness.

On the other hand, sometimes the vehicle 500 is driven in a special driving situation that is different from the normal situation, such as a case where the driver wants to enjoy sport driving, a case where the vehicle 500 runs on a rough road (like snowy road), or the like, for instance. In the present example, the vehicle 500 is driven in a special mode in such cases. The drive is capable of switching between running in the normal mode and running in the special mode by operating the mode switcher 33. Note that, the special mode includes a running mode in which motor output is higher than the normal mode like sport driving, a mode in which the respective wheels are controlled appropriately for running on the rough road, and the like. In the case where the vehicle 500 runs in the special mode, the control specifications are set such that the maximum rated torque is used as the upper limits of basic torque output performance.

Specifically, when the driver operates the mode switcher 33 and the special mode is turned on, the first motor controller 110 increases allowable maximum torque of the motor 20 up to the maximum rated torque. In a similar way, the second motor controller 120 increases allowable maximum torque of the motor 22 up to the maximum rated torque. Accordingly, the allowable maximum torque of the motors 20 and 22 is set such that the maximum rated torque is used as the upper limits when the special mode is turned on, although the allowable maximum torque of the motors 20 and 22 is set such that the continuous rated torque is used as the upper limits in the normal mode. In other words, control is performed such that the continuous rated torque is used as the allowable upper limit torque in the normal mode, but the maximum rated torque is used as the allowable upper limited torque only when the special mode is turned on.

Figure 4:
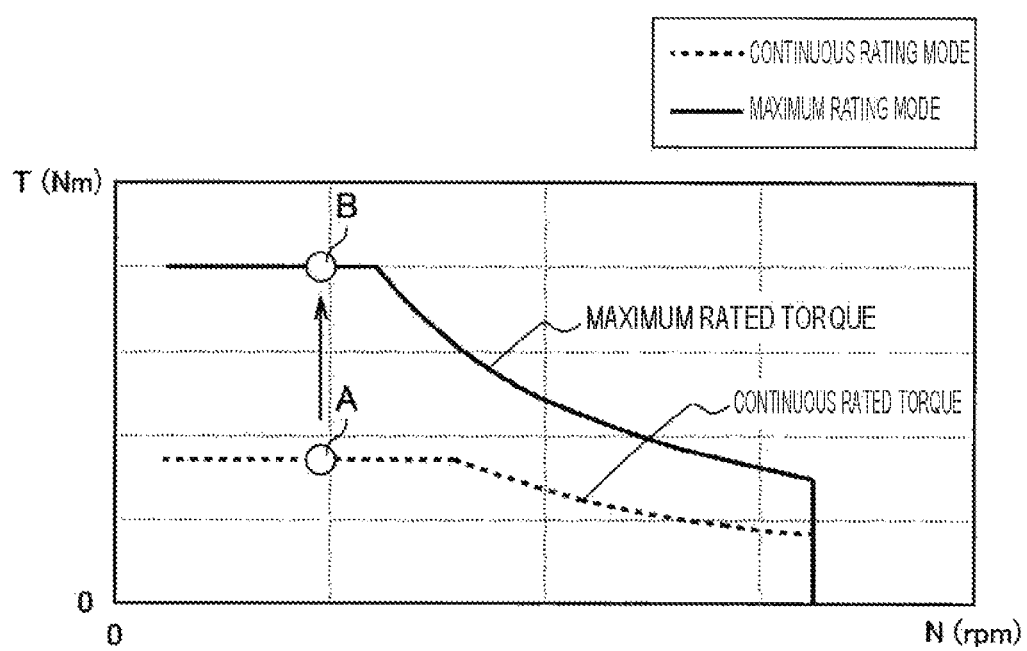
FIG. 4 is a schematic diagram illustrating an overview of a control method of the motor according to the example.

FIG. 4 is a schematic diagram illustrating an overview of a control method of the motors 20 and 22 according to the present example. First, in the normal mode, the motor 20 of the front wheels and the motor 22 of the rear wheels are driven with the torque and at the rotation speed that are indicated by a point A illustrated in FIG. 4. Accordingly, the motors 20 and 22 are driven while using the continuous rated torque in the continuous rating mode as the upper limits.

Next, when the driver operates the mode switcher 33 and the normal mode is switched to the special mode, the motor 20 of the front wheels and the motor 22 of the rear wheels are driven with the torque and at the rotation speed that are indicated by a point B illustrated in FIG. 4. Accordingly, the motors 20 and 22 are driven while using the maximum rated torque in the maximum rating mode as the upper limits.

Figure 5:
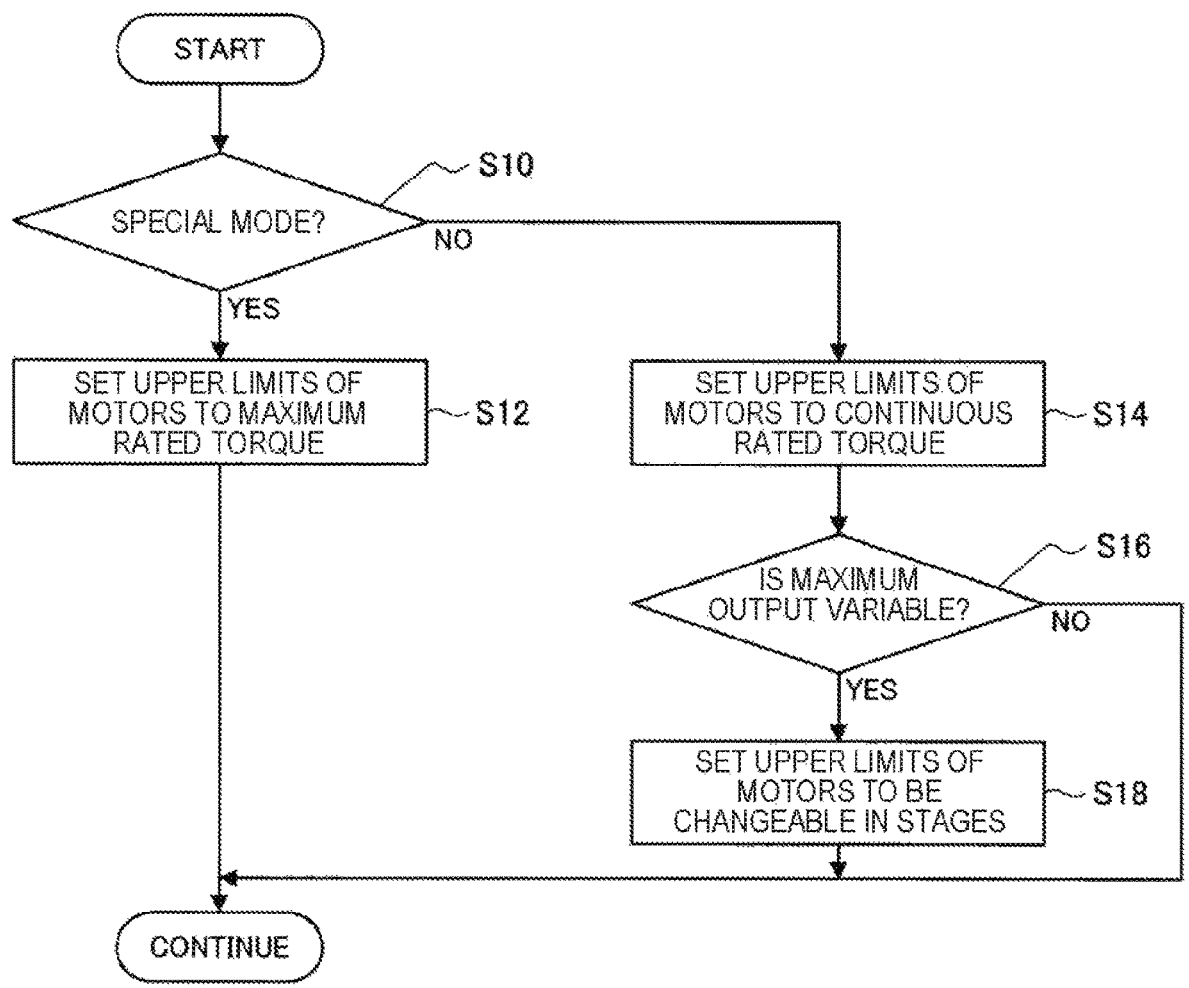
FIG. 5 is a flowchart illustrating a procedure of a process in the control device according to the example.

Next, a procedure of a process in the control device 100 according to the present example will be described on the basis of a flowchart illustrated in FIG. 5. The process in FIG. 5 is performed at a predetermined control interval. First, in Step S10, the switch information acquirer 120 determines whether the driving mode is the special mode, on the basis of information acquired from the mode switcher 33. In the case where the driving mode is the special mode, the process proceeds to Step S12. In Step S12, the upper limits of output from the motors 20 and 22 are set to the maximum rated torque.

On the other hand, in the case where the driving mode is not the special mode in Step S10, in other words, in the case where the driving mode is the normal mode, the process proceeds to Step S14. In Step S14, the upper limits of output from the motors 20 and 22 are set to the continuous rated torque.

After Step S14, the process proceeds to Step S16, and it is determined whether the maximum output is variable. In the case where the maximum output is variable, the process proceeds to Step S18. In Step S18, the upper limits of output from the motors 20 and 22 are set to be changeable in stages.

Figure 6:
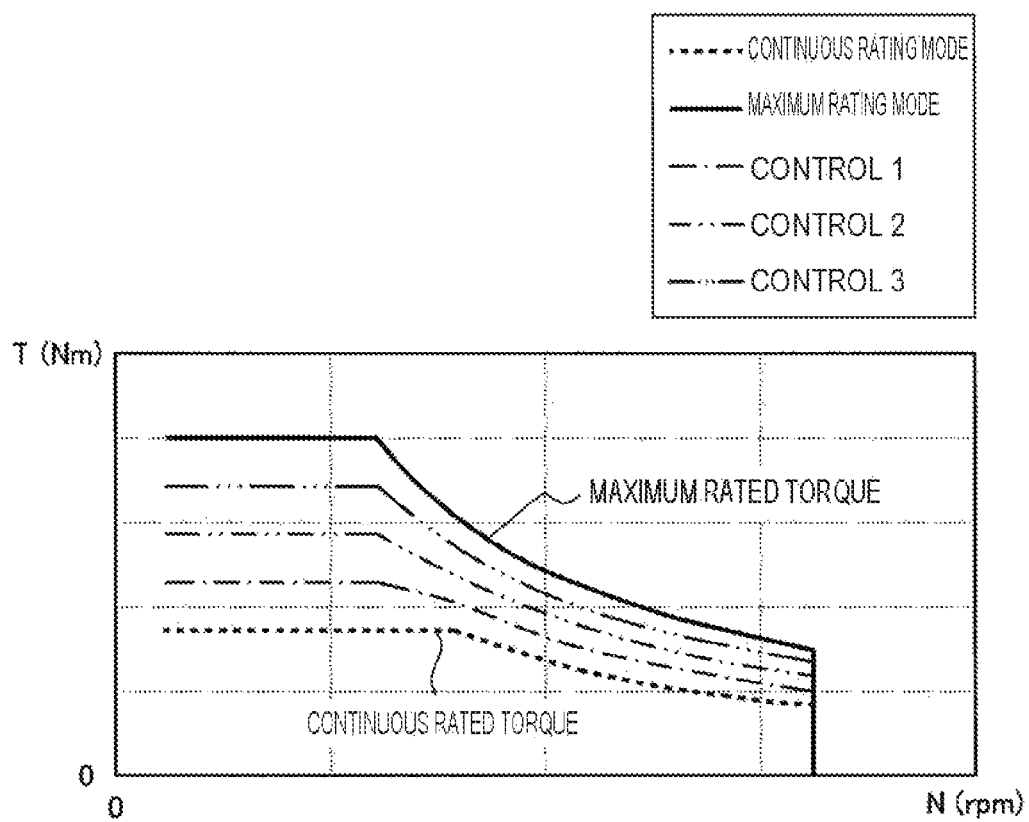
FIG. 6 is a schematic diagram illustrating an instance of changing output from the motor in stages.

FIG. 6 is a schematic diagram illustrating an instance of changing output from the motors 20 and 22 in stages. In the instance illustrated in FIG. 6, there are three torque characteristics (control 1 to 3) between the maximum rated torque and the continuous rated torque. In Step S18, the maximum output limiter 140 limits torque output from the motors 20 and 22 to torques indicated by three controls 1 to 3 illustrated in FIG. 6, in accordance with the shift operator 38 operated by the driver. The first motor controller 110 and the second motor controller 120 controls the motors 20 and 22 on the basis of the torque limited by the maximum output limiter 140. For instance, the motors 20 and 22 are controlled such that the torque of the control 1 in FIG. 6 is used as the upper limits when the shift operator 38 is operated by one stage in Step S18 after the upper limits of output from the motors 20 and 22 are set to the continuous rated torque in Step S14.

Alternatively, the motors 20 and 22 are controlled such that the torque of the control 2 in FIG. 6 is used as the upper limits when the shift operator 38 is operated by two stages in Step S18 after the upper limits of output from the motors 20 and 22 are set to the continuous rated torque in Step S14. In a similar way, the motors 20 and 22 are controlled such that the torque of the control 3 in FIG. 6 is used as the upper limits when the shift operator 38 is operated by three stages in Step S18 after the upper limits of output from the motors 20 and 22 are set to the continuous rated torque in Step S14.

As described above, in the case where it is determined that the maximum output is variable in Step S16, the motors 20 and 22 are driven with torque that is larger than the continuous rated torque and smaller than the maximum rated torque in accordance with the shift operator 38 operated by the driver. According to such control, it is possible to gain time until the driving mode of the motors 20 and 22 becomes the continuous rating mode due to heat generation or the like in the motors 20 and 22, in comparison with a case where the maximum rated torque is used as the upper limits of the output from the motors 20 and 22. Accordingly, it is possible to gain time until the torque is actually suppressed to the continuous rated torque.

The process is once ended after Step S12 or Step S18. In addition, the process is once ended also in the case where it is determined that the maximum output is not variable in Step S16.

As described above, according to the present example, the motors 20 and 22 are controlled such that the continuous rated torque is used as the upper limits in the case where the driving mode is the normal mode, and the motors 20 and 22 are controlled such that the maximum rated torque is used as the upper limits when the driving mode is switched to the special mode. This enables keeping stability of the vehicle 500 in the normal mode without suddenly decreasing the output from the motors 20 and 22. Alternatively, in the case where the driving mode is the special mode, the motors 20 and 22 are controlled such that the maximum rated torque is used as the upper limits. Therefore, it is possible for the motors 20 and 22 to exert the maximum output in the case of sport driving, running on a rough road, or the like. In other words, it is possible to certainly suppress reduction in output occurred due to overloads on the motors.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A control device of a vehicle, the control device comprising
   a motor controller capable of controlling a motor configured to generate a driving force of the vehicle, and switching between a first driving mode for driving the motor while using a continuous rated torque as an upper limit and a second driving mode for driving the motor while using a maximum rated torque as an upper limit, the continuous rated torque being lower than the maximum rated torque generatable by the motor, and
   a maximum output limiter configured to limit a torque output from the motor to a predetermined torque between the maximum rated torque and the continuous rated torque, in accordance with a driving mode specified by a driver,
   wherein the motor controller drives the motor in the first driving mode in a case where the driver does not specify the driving mode,
   wherein the motor controller drives the motor in the second driving mode in a case where the driver specifies the driving mode,
   wherein the driver specifies the driving mode through a paddle shift, and
   wherein the second driving mode is performed by operating a mode switcher.

2. The control device of a vehicle according to claim 1, wherein the maximum rated torque is a torque whose duration is limited in a case where the motor is driven by the maximum rated torque.

3. The control device of a vehicle according to claim 2, wherein the continuous rated torque is a torque whose duration is not limited in a case where the motor is driven by the continuous rated torque.

4. The control device of a vehicle according to claim 1, wherein the continuous rated torque is a torque whose duration is not limited in a case where the motor is driven by the continuous rated torque.

5. A control method of a vehicle that is performed by a control device of the vehicle, the control device comprising
   a motor controller capable of controlling a motor configured to generate a driving force of the vehicle, and switching between a first driving mode for driving the motor while using a continuous rated torque as an upper limit and a second driving mode for driving the motor while using a maximum rated torque as an upper limit, the continuous rated torque being lower than the maximum rated torque generatable by the motor, and
   a maximum output limiter configured to limit a torque output from the motor to a predetermined torque between the maximum rated torque and the continuous rated torque, in accordance with a driving mode specified by a driver,
   wherein the motor is driven in the first driving mode in a case where the driver does not specify the driving mode,
   wherein the motor controller drives the motor in the second driving mode in a case where the driver specifies the driving mode,
   wherein the driver specifies the driving mode through a paddle shift, and
   wherein the second driving mode is performed by operating a mode switcher.

6. A control device of a vehicle, the control device comprising
   circuitry configured to control a motor configured to generate a driving force of the vehicle, and switch between a first driving mode for driving the motor while using a continuous rated torque as an upper limit and a second driving mode for driving the motor while using a maximum rated torque as an upper limit, the continuous rated torque being lower than the maximum rated torque generatable by the motor, and
   a maximum output limiter configured to limit a torque output from the motor to a predetermined torque between the maximum rated torque and the continuous rated torque, in accordance with a driving mode specified by a driver,
   wherein the circuitry drives the motor in the first driving mode in a case where the driver does not specify the driving mode,
   wherein the motor controller drives the motor in the second driving mode in a case where the driver specifies the driving mode,
   wherein the driver specifies the driving mode through a paddle shift, and
   wherein the second driving mode is performed by operating a mode switcher.

* * * * *